United States Patent
Zhang

(10) Patent No.: US 9,020,511 B2
(45) Date of Patent: Apr. 28, 2015

(54) AUTOMATIC MUTUAL DISCOVERY FEMTOCELL SYSTEM AND ASSOCIATED METHOD

(71) Applicant: Sercomm Corporation, Taipei (TW)

(72) Inventor: Yuan Zhang, Jiangsu (CN)

(73) Assignee: Sercomm Corporation, Taipei (TW)

( * ) Notice: Subject to any disclaimer, the term of this patent is extended or adjusted under 35 U.S.C. 154(b) by 126 days.

(21) Appl. No.: 14/024,669

(22) Filed: Sep. 12, 2013

(65) Prior Publication Data

US 2014/0148092 A1    May 29, 2014

(30) Foreign Application Priority Data

Nov. 26, 2012 (CN) .......................... 2012 1 0483448

(51) Int. Cl.
*H04W 36/00* (2009.01)
*H04W 48/16* (2009.01)
*H04W 48/12* (2009.01)
*H04W 84/04* (2009.01)

(52) U.S. Cl.
CPC .............. *H04W 48/16* (2013.01); *H04W 48/12* (2013.01); *H04W 84/045* (2013.01)

(58) Field of Classification Search
USPC ........... 455/424, 426.1, 435.2, 436–444, 449, 455/450; 370/328
See application file for complete search history.

(56) References Cited

U.S. PATENT DOCUMENTS

| | | | | |
|---|---|---|---|---|
| 8,391,882 B2* | 3/2013 | Sampath et al. | ............... | 455/454 |
| 8,548,455 B2* | 10/2013 | Kent et al. | .................. | 455/422.1 |
| 2009/0288139 A1* | 11/2009 | Huber et al. | ....................... | 726/2 |
| 2010/0027469 A1* | 2/2010 | Gurajala et al. | ............... | 370/328 |
| 2010/0120438 A1* | 5/2010 | Kone et al. | ..................... | 455/444 |
| 2010/0159917 A1* | 6/2010 | Majmundar et al. | .......... | 455/423 |
| 2010/0203891 A1* | 8/2010 | Nagaraja et al. | ............... | 455/436 |
| 2010/0246482 A1* | 9/2010 | Erceg et al. | ..................... | 370/328 |
| 2010/0322218 A1* | 12/2010 | Liu | ............................... | 370/338 |
| 2011/0128916 A1* | 6/2011 | Kwon et al. | ................... | 370/328 |
| 2011/0207435 A1* | 8/2011 | Hosono | ......................... | 455/411 |

FOREIGN PATENT DOCUMENTS

CN           101400075 A       4/2009

OTHER PUBLICATIONS

CN Office Action dated Dec. 1, 2014.
English Abstract translation for CN101400075A (Published Apr. 1, 2009).

* cited by examiner

*Primary Examiner* — Dominic E Rego
(74) *Attorney, Agent, or Firm* — McClure, Qualey & Rodack, LLP

(57) ABSTRACT

An automatic mutual discovery femtocell system and associated method are provided. Each femtocell includes: a system information self-definition and update module for pre-defining or automatically updating a self-defined system information block (SIB), a broadcast information module, a scanning module, and an analysis and connection establishment module. The self-defined SIB includes at least one of an identity code, an IP address, a UTRA absolute radio frequency channel number (UARFCN), a cell parameter identity (CPI), and a group identity. The latest self-defined SIB of a host femtocell is broadcasted to surroundings, a self-defined SIB of a neighboring cell of the host femtocell is scanned and analyzed, and a connection is established with the femtocell corresponding to the self-defined SIB. Without involving manual intervention or relying on wired networks, the femtocells can quickly discovering one another and updating changes in neighboring femtocells, thereby enhancing efficiency of collaborative operations.

7 Claims, 3 Drawing Sheets

AUTOMATIC MUTUAL DISCOVERY FEMTOCELL SYSTEM AND ASSOCIATED METHOD

This application claims the benefit of People's Republic of China application Serial No. 201210483448.4, filed Nov. 26, 2012, the subject matter of which is incorporated herein by reference.

BACKGROUND OF THE INVENTION

1. Field of the Invention

The invention relates in general to a mobile communication system deployment, and more particularly to a system deployment capable of automatically discovering neighboring femtocells through wireless and non-manual means for a plurality of deployed femtocells and an automatic mutual discovery method thereof.

2. Description of the Related Art

In a deployment of femtocells for household uses or a higher level such as enterprise uses, multiple femtocells need to be deployed for collaborative operations in order to meet a full coverage of signals. As such, these femtocells are required to operate in collaboration to thoroughly exercise maximum performance. For example, a loading balance among the femtocells needs to be achieved. A so-called femtocell is a small base station used in a household or enterprise signal coverage. A basis for collaborative operations of the femtocells is that, before communicating and connecting to one another, the femtocells need to learn the existence of neighboring femtocells and basic information of the neighboring femtocells. Therefore, it is a task for persons skill in the art to provide a technical solution for femtocells to automatically discover one another.

A signal in a 3GPP TS25.331 system is briefly explained as follows. System information blocks (SIB, to which same or similar parts in the description below shall be referred) of base stations are periodically broadcasted on a broadcast control channel (BCCH) to transmit network messages to terminal networks in real-time, and include public information of access networks and core networks. The SIBs in the mobile communication system primarily include a main information block (MIB), a scheduling block (SB1), an SB2, and SIB1 to SIB18. Each of the SIB1 to SIB18 contains different contents of different purposes. In practice, instead of utilizing all of the SIB1 to SIB18, only a part of SIB1 to SIB18 is utilized. Each of the SIB1 to SIB18 has a specific broadcast position and broadcast period. In a normal process of a user equipment (UE) receiving a system signal, the UE first reads the MIB and then fetches scheduling information from the MIB. The scheduling information includes the SB1, SB2 and positions and periods of other SIBn (where n is 1, 2, . . . , 18). Alternatively, when the MIB does not include the scheduling information, the remaining scheduling information is stored in the SB1 or SB2, from which the positions and periods of the other SIBn can be retrieved in a phased manner, thereby receiving all of the system information blocks.

SUMMARY OF THE INVENTION

In view of the above issues of the prior art and technical basis, the present invention is directed to an automatic mutual discovery femtocell system and associated method, so as to achieve a system deployment solution capable of automatically discovering neighboring femtocells through wireless and non-manual means.

According to an aspect of the present invention, an automatic mutual discovery femtocell system is provided. The automatic mutual discovery femtocell system includes a plurality of femtocells deployed in a Universal Mobile Telecommunications System (UMTS) standard application environment. The automatic mutual discovery femtocell system is characterized in that, each of the femtocells comprises: an SIB self-definition and update module, for pre-defining or automatically updating a self-defined system information block of a host femtocell, wherein the self-defined system information block comprises at least one of an identity code, an IP address, a UTRA absolute radio frequency channel number (UARFCN), a cell parameter identity (CPI), and a group identity; a broadcast information module, for broadcasting a latest self-defined system information block of the host femtocell to surroundings; a scanning module, for scanning a self-defined system information block broadcasted by a neighboring cell of the host femtocell; and an analysis and connection establishment module, for analyzing the self-defined system information block received by the scanning module, and establishing a connection with the femtocell corresponding to the self-defined system information block.

According to another aspect of the present invention, an automatic discovery method for femtocells is provided. The method is applied to a plurality of femtocells deployed in a UMTS standard communication application environment, and is characterized by the following steps. In step S1, a self-defining and updating step of system information is performed. That is, a system information block of a host femtocell is pre-defined or automatically updated. The self-defined system information block comprises at least one of an identity code, an IP address, a UTRA absolute radio frequency channel number (UARFCN), a cell parameter identity (CPI), and a group identity. In step S2, an information broadcasting step is performed. That is, the latest self-defined system information block of the host femtocell is broadcasted to the surroundings. In step S3, a scanning step is performed. That is, a self-defined system information block broadcasted by a neighboring cell of the host femtocell is scanned. In step S4, an analyzing and connection establishing step is performed. More specifically, the self-defined system information block received is analyzed, and a connection with the femtocell corresponding to the self-defined system information block is established.

Through smart solution for discovering neighboring femtocells of the present invention, without manual intervention and without relying on wired connections, in a household or enterprise femtocell system deployment, the femtocells deployed are capable of quickly and automatically discovering one another as well as updating changes in the femtocells, thereby significantly enhancing the efficiency of collaborative operations of the femtocell system.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
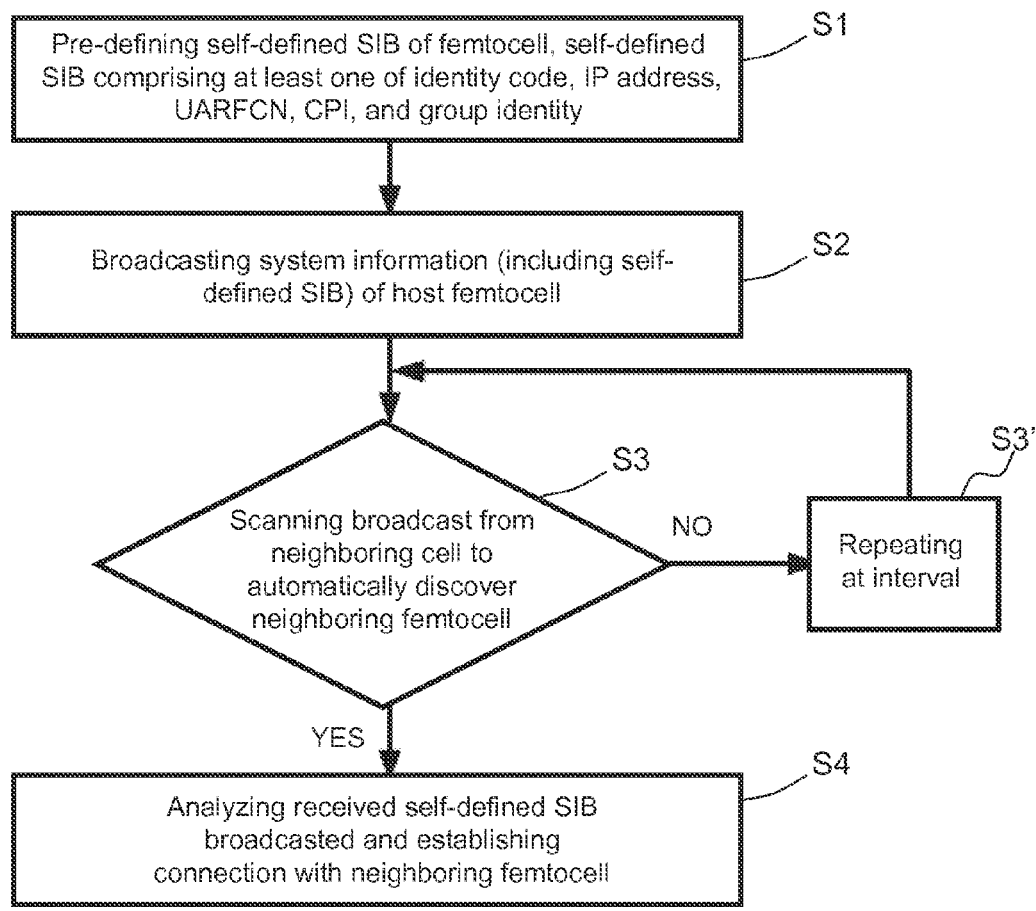
FIG. 1 is a flowchart of an automatic mutual discovery method in a femtocell system according to an embodiment of the present invention.

Through self-defined system information block that is broadcasted by a base station and different from a specific identity information block of a femtocell, as well as the base station accepting an analysis result, the present invention achieves automatic mutual discovery between the base station and the femtocell. The automatic mutual discovery femtocell system is a completely automatic and spontaneous discovery system that neither involves manual intervention nor relies on wired connections.

From perspectives of hardware structures, the automatic mutual discovery femtocell system comprises a plurality of femtocells deployed in a UMTS standard application environment.

Each of the femtocells comprises: an system information block self-definition and update module, for pre-defining or automatically updating a self-defined system information block of a host femtocell, wherein the self-defined system information block comprises at least one of an identity code, an IP address, a UTRA absolute radio frequency channel number (UARFCN), a cell parameter identity (CPI), and a group identity; a broadcast information module, for broadcasting a latest self-defined system information block of the host femtocell to surroundings; a scanning module, for scanning a self-defined system information block broadcasted by a neighboring cell of the host femtocell; and an analysis and connection establishment module, for analyzing the self-defined system information block received by the scanning module, and establishing a connection with the femtocell corresponding to the self-defined system information block.

More specifically, the self-defined system information block is defined from a non-common system information block of UMTS cell system information apart from a main information block (MIB), a scheduling block 1 (SB1) and a scheduling block 2 (SB2). For example, the system information block 17 (SIB17) may be utilized. The SIB17 is utilized for time-division duplexing (TDD), and includes fast updated parameters designated to a physical uplink shared channel (PUSCH) and a physical downlink shared channel (PDSCH) under a UE connection mode. In an actual time division environment, the PUSCH and PDSCH are usually not allotted or utilized, and so the SIB17 is idle. Other non-common system information blocks may also be selected and utilized, depending on actual application requirements. A broadcast position of the self-defined system information block may be a fixed position or a non-fixed position in a broadcast period or an idle period. The self-defined system information block may be processed in different segments if it exceeds a predetermined length. Further, in order not to interfere the acceptance on the system information block for a UE, the system information is not included in the MIB, SB1 and SB2, so that normal operations of the UE left unaffected.

Corresponding to the selection of the self-defined system information block, an idle broadcast type and/or a predetermined-position broadcast type may be selected for the broadcast information module.

For signal reception, the system deploys femtocells that support scanning all of the system information blocks and reading the self-defined system information block from the scanned system information blocks, and femtocells that support reading the self-defined system information block from a predetermined position.

An automatic discovery method for femtocells is also provided. The automatic mutual discovery method for the femtocells is based on a plurality of femtocells deployed in a UMTS standard application environment, and comprises the following steps. Referring to FIG. 1, in step S1, a self-defining and updating step of system information is performed. That is, a system information block of a host femtocell is pre-defined or automatically updated. The self-defined system information block comprises at least one of an identity code, an IP address, a UTRA absolute radio frequency channel number (UARFCN), a cell parameter identity (CPI), and a group identity. In step S2, an information broadcasting step is performed. That is, the latest self-defined system information block of the host femtocell is broadcasted to the surroundings. In step S3, a scanning step is performed. That is, a self-defined system information block broadcasted by a neighboring cell of the host femtocell is scanned. The scanning step is repeatedly performed according to a predetermined interval in an unlimited length (step S3'). In step S4, an analyzing and connection establishing step is performed. More specifically, the self-defined system information block received by the scanning module is analyzed, and a connection with the femtocell corresponding to the self-defined system information block is established.

It should be noted that, step S1 is performed in segments on a time axis. The defining part is only performed when the method is performed for the first time, and the updating part is automatically performed according to a change in the deployment (referring to FIG. 1).

Details of the self-defined system information block in step S1 are similar to associated descriptions on the hardware structures above, and shall be omitted herein.

In step S2, the step of information broadcasting comprises broadcasting the latest self-defined system information block in an idle period or at a predetermined position to the surroundings.

In step S3, the femtocell scans all of the system information blocks and reads the self-defined system information block from the scanned system information blocks, or the femtocell scans predetermined position and reads the self-defined system information block.

Figure 2:
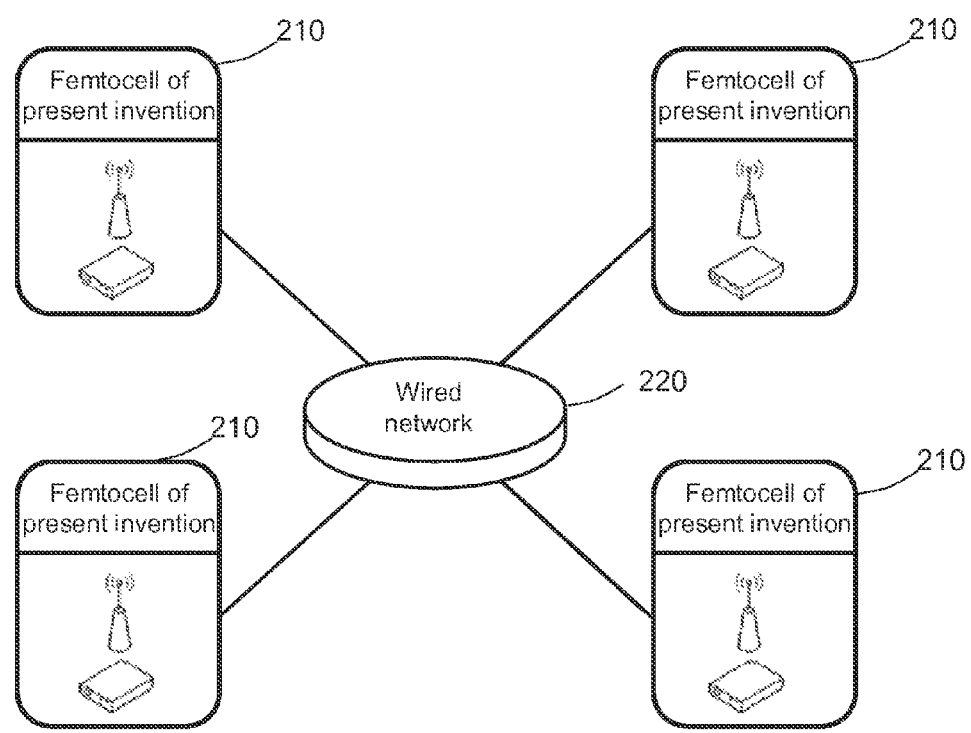
FIG. 2 is a block diagram of a femtocell system according to a preferred embodiment of the present invention.

In an exemplary application, the automatic mutual discovery femtocell system of the present invention may be regarded as a new device integrated or added to an existing femtocell. As shown in FIG. 2, any femtocell 210 has the ability of discovering a neighboring femtocell and communicating with the neighboring femtocell by broadcasting its information through the technical solution of the present invention. To exchange information with a neighboring cell, the femtocell 210 may communicate through a wired network 220. For example, when a loading of a femtocell 210 is too high and the femtocell 210 wishes to share the loading with a neighboring femtocell, the femtocell 210 may send the loading to be shared to the neighboring femtocell through a wired network 220. The neighboring femtocell, according to a level of its loading, may increase a transmission power under a low-level loading to attract more UEs to share their loading, thereby enhancing femtocell deployment efficiency of a household or enterprise application.

Figure 3:
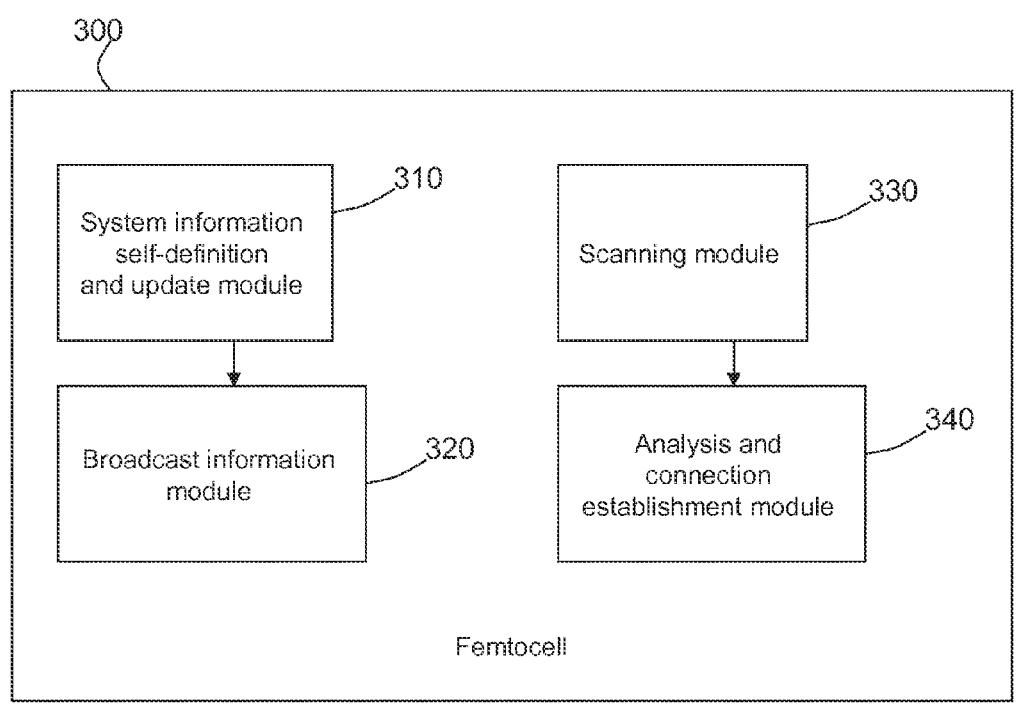
FIG. 3 is a simplified block diagram of one of the femtocells of FIG. 2.

FIG. 3 shows a simplified block diagram of one of the femtocells of FIG. 2. The femtocell 300 of FIG. 3 includes a system information self-definition and update module 310, a broadcast information module 320, a scanning module 330, and an analysis and connection establishment module 340. The system information self-definition and update module 310 is configured to perform the aforementioned step S1. The broadcast information module 320 is coupled to the system information self-definition and update module 310 and is configured to perform the aforementioned step S2. The scanning module 330 is configured to perform the aforementioned step S3. The analysis and connection establishment module 340 is coupled to the scanning module 330 and is configured to perform the aforementioned step S4. Other components of the femtocell 300 are omitted from FIG. 3 for the sake of simplicity.

Through the discovery method of the above embodiments, without involving manual intervention or relying on wired connections, in a household or enterprise femtocell system deployment, any deployed femtocell is capable of smartly in real-time updating the information of the neighboring femtocell, so as to quickly and automatically discover one another as well as updating changes in the femtocells, thereby significantly enhancing the efficiency of collaborative operations of the femtocell system.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An automatic mutual discovery femtocell system, comprising a plurality of femtocells deployed in a Universal Mobile Telecommunications System (UMTS) standard application environment; each of the femtocells comprising:
   a system information self-definition and update module, for pre-defining or automatically updating a self-defined system information block of a host femtocell, wherein the self-defined system information block comprises at least one of an identity code, an IP address, a UTRA absolute radio frequency channel number (UARFCN), a cell parameter identity (CPI), and a group identity;
   a broadcast information module, for broadcasting the latest self-defined system information block of the host femtocell to surroundings;
   a scanning module, for scanning a self-defined system information block broadcasted by a neighboring femtocell of the host femtocell; and
   an analysis and connection establishment module, for analyzing the self-defined system information block received by the scanning module, and establishing a connection with a femtocell corresponding to the self-defined system information block.

2. The automatic mutual discovery femtocell system according to claim 1, wherein the self-defined system information block is defined from a non-common system information block of UMTS cell system information apart from a main system information block, a scheduling block and a scheduling block; and the non-common system information block comprises a system information block.

3. The automatic mutual discovery femtocell system according to claim 1, wherein the femtocells comprise femtocells that support scanning of all system information blocks and reading the self-defined system information block from the scanned system information blocks, and femtocells that support reading the self-defined system information block from a predetermined position.

4. An automatic discovery method for a plurality of femtocells deployed in a UMTS standard application environment, comprising:
   pre-defining or automatically updating a self-defined system information block of a host femtocell, wherein the self-defined system information block comprises at least one of an identity code, an IP address, a UTRA absolute radio frequency channel number (UARFCN), a cell parameter identity (CPI), and a group identity;
   broadcasting the latest self-defined system information block of the host femtocell to surroundings;
   scanning a self-defined system information block broadcasted by a neighboring femtocell of the host femtocell; and
   analyzing the self-defined system information block received by a scanning module, and establishing a connection with a femtocell corresponding to the self-defined system information block.

5. The automatic discovery method according to claim 4, wherein the self-defined system information block is defined from a non-common system information block of UMTS cell system information apart from a main system information block, a scheduling block and a scheduling block; and the non-common system information block comprises a system information block.

6. The automatic discovery method according to claim 4, wherein the step of broadcasting the latest self-defined system information block comprises broadcasting the latest self-defined system information block of the host femtocell during an idle period or at a predetermined position.

7. The automatic discovery method according to claim 4, wherein in the step of scanning the self-defined system information block comprises scanning all system information blocks and reading the self-defined system information block from the scanned system information blocks, or scanning a predetermined position and reading the self-defined system information block.

* * * * *